United States Patent
Franzen et al.

(10) Patent No.: US 8,100,160 B2
(45) Date of Patent: Jan. 24, 2012

(54) METHOD FOR TRANSFERRING A TRANSFER LAYER FROM A CARRIER FILM, FILM TRANSFER APPARATUS AND COVERING SURFACE FOR A FILM TRANSFER APPARATUS

(75) Inventors: Peter Franzen, Hirschhorn (DE); Nils Klockmann, Weinheim (DE); Alexander Weber, Weinheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 206 days.

(21) Appl. No.: 12/364,093

(22) Filed: Feb. 2, 2009

(65) Prior Publication Data

US 2009/0205772 A1    Aug. 20, 2009

Related U.S. Application Data (60) Provisional application No. 61/031,509, filed on Feb. 26, 2008.

(30) Foreign Application Priority Data

Feb. 1, 2008   (DE) .................. 10 2008 007 380

(51) Int. Cl.
*B32B 41/00* (2006.01)
(52) U.S. Cl. ........ 156/358; 156/360; 156/384; 156/386; 156/540; 100/50
(58) Field of Classification Search .............. 156/358, 156/360, 384, 386, 540; 100/50
See application file for complete search history.

(56) References Cited

U.S. PATENT DOCUMENTS

| | | | | |
|---|---|---|---|---|
| 5,448,949 | A | * | 9/1995 | Bucher ................... 101/216 |
| 5,562,027 | A | * | 10/1996 | Moore ..................... 100/35 |
| 5,565,054 | A | | 10/1996 | Lappe et al. |
| 5,735,994 | A | | 4/1998 | Lappe et al. |
| 2007/0234919 | A1 | | 10/2007 | Lappe |
| 2008/0216678 | A1 | | 9/2008 | Stockli |

(Continued)

FOREIGN PATENT DOCUMENTS

DE            9104151 U1      7/1991

(Continued)

OTHER PUBLICATIONS

European Search Report dated Jun. 15, 2009.

(Continued)

*Primary Examiner* — George Koch
(74) *Attorney, Agent, or Firm* — Laurence A. Greenberg; Werner H. Stemer; Ralph E. Locher (57) ABSTRACT

A film transfer apparatus includes an application unit, a transfer unit downstream of the application unit, and at least one third unit for further processing a printing material with a transfer layer applied. In the prior art, if contact pressure is exerted on coated printing material again in a following nip, the adhesive layer under the transfer layer can be pressed out. A blanket can then be contaminated with adhesive, ink itself can be contaminated and parts of the transfer layer can be detached from the coated sheet. In order to avoid pressing out the adhesive, measured values in the transfer unit are compared with corresponding values in the third unit. At least one controlled variable in the units can then be readjusted on the basis of a difference, to at least reduce the quantity of adhesive squeezed out. A transfer method and a covering surface are also provided.

7 Claims, 5 Drawing Sheets

U.S. PATENT DOCUMENTS

2008/0251190 A1    10/2008    Weber et al.

FOREIGN PATENT DOCUMENTS

| DE | 10 2006 015 474 A1 | 10/2004 |
|---|---|---|
| DE | 102007009884 A1 | 9/2007 |
| EP | 0 578 706 B1 | 11/1994 |
| EP | 1493565 A2 | 1/2005 |
| GB | 2244676 A | 11/1991 |
| WO | 2004/002741 A1 | 1/2004 |
| WO | 2005/049322 A1 | 6/2005 |
| WO | 2007/025399 A2 | 3/2007 |

OTHER PUBLICATIONS

German Patent and Trademark Office Search Report, dated Aug. 19, 2008.

\* cited by examiner

METHOD FOR TRANSFERRING A TRANSFER LAYER FROM A CARRIER FILM, FILM TRANSFER APPARATUS AND COVERING SURFACE FOR A FILM TRANSFER APPARATUS

CROSS-REFERENCE TO RELATED APPLICATIONS

This application claims the priority, under 35 U.S.C. §119, of German Patent Application DE 10 2008 007 380.6, filed Feb. 1, 2008; this application also claims the priority, under 35 U.S.C. §119(e), of U.S. Provisional Patent Application No. 61/031,509, filed Feb. 26, 2008; the prior applications are herewith incorporated by reference in their entirety.

BACKGROUND OF THE INVENTION

Field of the Invention

The present invention relates to methods for transferring a transfer layer from a carrier film to a printing material. The transfer layer and the carrier film together form a transfer film. The printing material has adhesive applied to it, at least in some regions, in an application unit and then, together with the transfer film, is led through a transfer nip, formed by transfer and impression surfaces set against each other, in a transfer unit. In the transfer nip, the transfer layer is transferred partially to the printing material, substantially in the regions to which adhesive is applied, under the action of a first contact pressure. Then, together with the transferred transfer layer, the printing material is fed to a third unit which has at least one nip that is formed by two surfaces set against each other. The printing material with the transfer layer is led through the nip and, in the nip, a contact pressure can at least be exerted on the printing material with the transfer layer.

Furthermore, the invention relates to a film transfer apparatus, including an application unit for applying an adhesive, at least in some regions, to a printing material led through the application unit, a transfer unit disposed downstream of the application unit and having a transfer nip for the transfer to the printing material, at least in some regions, of a transfer layer from a carrier film, which together form a transfer film, and at least one third unit having a nip formed by two surfaces for the further processing of the printing material with the transfer layer applied.

In addition, the invention also further relates to a covering surface to be drawn onto a cylinder of a transfer unit, preferably in a film transfer apparatus.

The invention preferably relates to an apparatus, a method and a covering surface which are suitable for so-called cold film embossing.

During cold film embossing, a transfer layer is transferred from a carrier material to a printing material.

The carrier material used is a carrier film. A contact adhesive layer can be applied to the transfer layer, which improves the contact adhesive properties of the transfer layer with an adhesive on the printing material. The layers which are transferred from the carrier material are jointly designated as a transfer layer, irrespective of their actual structure.

In order to transfer the transfer layer to a printing material, the transfer film is led through a transfer nip together with the printing material. The transfer nip is formed by a transfer cylinder and an impression cylinder, which rest on each other. The transfer cylinder and the impression cylinder, while rotating, are set against each other with a contact force such that the transfer layer is transferred to the printing material in the transfer nip.

In order to ensure that a transfer of the transfer layer to the printing material can be carried out in some regions, before the film transfer, the printing material is provided with an adhesive layer, which corresponds to the region in which film is intended to be transferred.

The adhesive used can be a colorless adhesive, an adhesive with a specific inherent color or an adhesive dyed to correspond to the film.

The transfer layer can substantially be a metal layer but also other layers. For instance, an aluminum layer can be provided which, as required, is applied to a yellow/golden varnish layer or a silver varnish layer.

Furthermore, the transfer layer used can also be a colorless layer, for example of PE film, which is transferred to the printing material in such a way that it forms a protective layer there.

An apparatus for cold film embossing is presented in European Patent EP 0 578 706 B1, corresponding to U.S. Pat. Nos. 5,735,994 and 5,565,054.

In that case, the cold film embossing takes place within a multicolor printing press. The printing material is transported along a predefined transport path in the printing press. The printing material can, for example, be paper sheets, paperboard, film or rolls or webs.

In a first printing unit of the printing press, an adhesive is transferred to the printing material instead of an ink. In order to apply the adhesive in some regions, an appropriately imaged printing plate is clamped on in that printing unit and the adhesive is transferred to the printing material like a conventional offset printing ink. Such a printing unit applying an adhesive is designated as an application unit.

The printing material is then transported further into a second printing unit. In that second printing unit, the impression cylinder and the blanket cylinder form the transfer unit and the blanket cylinder is then the transfer cylinder.

In the region of that second printing unit there is a film module having a transfer film supply spool and a transfer film collecting spool. The film is guided over intermediate rollers of a film guiding device, as a transfer film web, from the transfer film supply spool to the transfer nip and further to the transfer film collecting spool. The transfer film web can also be designated more briefly as a film web.

In order to transfer the transfer layer to the printing material, the transfer film web and the printing material with the adhesive layer in some regions are guided jointly along their respective transport paths through the transfer nip in such a way that the transfer layer rests on the adhesive layer. Then, in the transfer nip, the transfer layer is transferred to the printing material with a contact pressure. The transfer layer is then taken off the transfer film by the adhesive.

In a following pressing unit, action is taken on the transfer layer being transferred, so that permanent adhesion of the top film layer is achieved.

It is known from German Published, Non-Prosecuted Patent Application DE 10 2006 015 474 A1, corresponding to U.S. Patent Application Publication No. US 2008/0251190A1, that the film transfer apparatus can be a conventional offset printing press, for example a four-color printing press. The transfer unit and the following units can be further processing units of the printing press, in particular further printing units can be provided in that case. Varnishing, anilox, perforating, punching, creasing, cutting or embossing units can also be provided as further processing or further treatment units of the printing press.

Both in European Patent EP 0 578 706 B1, corresponding to U.S. Pat. Nos. 5,735,994 and 5,565,054 and in German Published, Non-Prosecuted Patent Application DE 10 2006 015 474 A1, corresponding to U.S. Patent Application Publication No. US 2008/0251190A1, provision is made for the printing material with the transfer layer applied to run through further processing devices, that is further treatment units of the printing press, after the transfer unit.

Those further treatment units can be rendered inactive, in particular during the use of the printing press as a film transfer apparatus, and act effectively on the printing material only when no transfer layer has been applied to the latter. The film transfer unit can then be used as a conventional printing unit, just like the adhesive application unit.

However, it is also possible to use the further treatment units actively during the use of the printing press as a film transfer apparatus.

The printing material with the transfer layer applied is then led through a nip of the further treatment unit. In that nip, the printing material with the transfer layer applied can be subjected to a further contact pressure. The further treatment unit can, for example, be a conventional printing unit of a printing press. The nip is then a printing press nip of that printing unit and is formed by the blanket cylinder and the impression cylinder set against the blanket cylinder.

The contact pressure which acts on the coated printing material can be varied both in the film transfer unit and in the subsequent further treatment unit. In that case, that contact pressure results from the contact force with which the surfaces involved in the nip are set against each other. In the printing press nip and in the transfer nip, those are the blanket cylinder and the impression cylinder. For that purpose, the contact force or the contact pressure is generally varied by adjusting the impression setting in the printing unit or film transfer unit.

The impression setting is a measure of the spacing of the axes of the cylinders involved in the nip.

The units with which the impression setting is specified are millimeters. The zero point of the impression setting is predefined by the spacing of the axes of the blanket cylinder in relation to the impression cylinder at which the surface of the blanket cylinder just makes contact with the surface of the printing material led through the printing press or transfer nip. The zero point of the impression setting is therefore always specified in relation to the printing material used.

The impression setting can therefore assume positive and negative values, depending on the printing material.

Negative impression setting values describe an intersection of the surface of the transfer cylinder or of the blanket cylinder with the surface of the printing material, which is accordingly compressed.

Positive values of the impression setting describe a spacing of the blanket or the transfer cylinder in relation to the impression cylinder in which the surface of the printing material is no longer touched.

Conventionally, the impression setting is specified in tenths of a millimeter but can be set in steps of 0.01 mm. Since, for conventional processing of a printing material in a further treatment unit, such as a printing unit of a printing press, contact between the cylinder and the printing material on both sides is usually desired, a negative impression setting is generally set. Therefore, in general spoken use, it has also become established to specify the negative impression setting only by its magnitude and without a negative sign.

It is possible for reductions in quality to occur in the resulting printing product as a result of the variable impression settings in the transfer unit and in the further treatment units downstream.

In the transfer nip of the transfer unit, the adhesive layer is covered accurately at the edges by the transfer layer. If a contact pressure is again exerted in a subsequent nip on the printing material coated in that way, then it is possible for the adhesive layer lying under the transfer layer to be forced out. That adhesive squeezed out under the transfer layer can then be picked up by a surface of the nip of the further treatment unit. For instance, the blanket of a blanket cylinder can be contaminated with adhesive in that way, which means that firstly an ink to be transferred becomes contaminated itself and secondly adhesive with the blanket can again detach parts of the transfer layer from the coated sheet.

SUMMARY OF THE INVENTION

It is accordingly an object of the invention to provide a method for transferring a transfer layer from a carrier film, a film transfer apparatus and a covering surface for a film transfer apparatus, which overcome the hereinafore-mentioned disadvantages of the heretofore-known methods and devices of this general type to such an extent that the quality of the printed product produced is improved and contamination of a subsequent further processing unit by adhesive is at least reduced.

This object of the invention is achieved by a film transfer apparatus of the afore-mentioned type, a covering surface interacting therewith to be drawn onto a cylinder of a transfer unit, and an appropriate method in accordance with the afore-mentioned type.

With the foregoing and other objects in view there is provided, in accordance with the invention, a method for transferring a transfer layer from a carrier film to a printing material, with the transfer layer and the carrier film together forming a transfer film, and the printing material having adhesive applied thereto at least in some regions in an application unit. The method comprises:

guiding the printing material, together with the transfer film, through a transfer nip formed by transfer and impression surfaces set against each other in a transfer unit;

partially transferring the transfer layer, in the transfer nip, to the printing material, substantially in the regions to which adhesive is applied, under action of a first contact pressure;

feeding the printing material, together with the transferred transfer layer, at least to one third unit having at least one nip formed by two surfaces set against each other;

guiding the printing material with the transfer layer through the at least one nip for exerting a contact pressure at least on the printing material with the transfer layer in the at least one nip;

varying the contact pressures in the transfer unit and the at least one third unit, at least by setting the surfaces forming the nips onto each other;

varying at least one controlled variable from the group consisting of contact force and impression setting in the transfer unit and at least in one following third unit;

detecting at least one of a set of measured variables including the contact pressure, the contact force and the impression setting in the transfer unit;

detecting at least one of a set of measured variables including the contact pressure, the contact force and the impression setting in the third unit; and depending on the measured variables detected, regulating at least one controlled variable in at least one of the units including the transfer unit and the following third unit, for counteracting differences between the measured variables detected in the units.

In the method according to the invention, the contact pressures in the transfer unit and in the third unit are varied through the settings of the surfaces forming the nip. In this case, it is necessary to take into account the fact that the transfer nip in the transfer unit is generally formed by a transfer cylinder, for example a blanket cylinder, and an impression cylinder, and the nip in the third unit is the nip of a corresponding further treatment unit. This nip can firstly be formed by two flat surfaces which are pressed against each other. It is also possible for a cylinder to be pressed against a flat surface or for two cylinders to be pressed against each other. If the third unit is a printing unit, for example, then the surfaces set against each other which form the nip are a blanket cylinder and an impression cylinder which together form the press nip.

If mention is made below of a printing unit press nip, then the intention is for all nip-forming surfaces to be covered.

Furthermore, the contact pressures in the transfer and third unit are intended to be variable through the impression setting. As described, the impression setting indicates how far the surface of one cylinder "dips into" a printing material used. This impression setting is variable in this case, according to the invention.

In order to prevent adhesive from being pressed out as a result of an excessively high action of force on the adhesive layer, provision is further made for at least one of the possible measured variables including contact pressure, impression setting and contact force of the surfaces in the transfer unit and/or the at least one third unit to be detected and, as a function thereof, for at least one of the controlled variables in the transfer and/or third unit to be regulated. Through the use of this regulation according to the invention, the force which acts on the adhesive layer in the transfer and in the third unit is regulated, according to the invention, in such a way that no more adhesive under a transfer layer can be pressed out. Controlled variables are the variables which in principle can be regulated in such a way that they are at least able to influence the contact pressure in a nip. Particularly preferred controlled variables in this case are those including impression setting and contact force. The impression setting has already been described and the setting force is the force with which the surfaces involved in the nip are set against each other. In this case, it does not matter whether only one surface or both are constructed to be movable for this purpose.

With the objects of the invention in view, there is also provided a film transfer apparatus, comprising an application unit for applying an adhesive at least to some regions of a printing material guided through the application unit, a transfer unit disposed downstream of the application unit and having a transfer nip for transferring a transfer layer at least to some regions of the printing material, the transfer layer and a carrier film together forming a transfer film, and at least one third unit having a nip formed by two surfaces for further processing of the printing material with the transfer layer applied. At least one setting apparatus is provided for setting at least one controlled variable selected from the group consisting of contact force and impression setting in the transfer nip of the transfer unit and/or the nip of the at least one third unit as a function of at least one detected measured variable selected from the group consisting of contact pressure, contact force and impression setting in the nips.

In order to achieve the object in terms of the apparatus, a film transfer apparatus of the aforementioned type is provided which provides at least one setting apparatus for setting at least one of the above-described controlled variables including contact force and impression setting in the transfer nip of the transfer unit and/or in the nip of the third unit as a function of one of the detected measuring variables from the set including contact pressure, contact force and impression setting in the nips.

According to the invention, provision is advantageously made for one or more of the measured values in the transfer unit to be compared with the corresponding value in the third unit. From this comparison of the different measured variables, a measure is formed which provides an indication of the difference in the measured variables in the various units. On the basis of this difference, at least one controlled variable in the units can then be readjusted in order at least to reduce the quantity of adhesive squeezed out.

According to the invention, for this purpose the film transfer apparatus has a setting apparatus which includes at least one registering device for detecting at least one of the measured variables including contact pressure, contact force and impression setting in the transfer nip of the transfer unit and in the nip of the at least one third unit.

Furthermore, provision is made for the setting apparatus to include an evaluation device for evaluating the measured variables detected and a control device for regulating one of the controlled variables including contact force and impression setting in the transfer nip of the transfer unit and/or the nip of the third unit as a function of at least one of the measured variables detected.

According to the invention, this measure, which specifies the difference between the values detected in the transfer unit and third unit, can be formed by the difference or the ratio of the values detected. For this purpose, according to the invention an evaluation device having at least one ratio and/or difference forming element is then provided to determine a ratio or difference of the measured variables detected.

In order to prevent adhesive under the transfer layer from being squeezed out in a third unit downstream of the transfer unit, provision is made for the contact pressure which acts on the printing material with the adhesive and the transfer layer in the following third unit to not substantially exceed the contact pressure which acts on the printing material in the transfer unit. For this purpose, the invention provides for the impression setting or the contact force of the surfaces involved in the nip to be varied in such a way that the contact pressure, the contact force or the impression setting in the third unit does not substantially exceed the corresponding value in the transfer unit.

As a result of the contact pressure which acts on the adhesive and the transfer layer in the transfer unit, the adhesive layer is already pressed out to the maximum extent in this case. However, the adhesive is in contact with the transfer layer of the transfer film over its entire surface extent. In this way, the adhesive pressed out is also joined to the transfer layer over the entire area and with sharp edges and picks up this transfer layer from the transfer film. In this case, no adhesive is therefore pressed out under the transfer layer.

If, in a third unit, no increased contact pressure acts any more on the adhesive layer which would broaden the adhesive layer to a greater extent than would occur in any case as a result of the contact pressure in the transfer nip, then no adhesive can be pressed to the outside in this unit.

It has been established that the contact pressure which acts on the transfer layer and the applied adhesive in the transfer unit is also intensified further by the carrier film, which is present only in the transfer unit and not in the subsequent third unit. In this way, deviations in the setting of the maximum differences between the forces acting or the impression settings in the transfer and the subsequent third unit can advantageously be tolerated within limits.

In an advantageous further development according to the invention, provision is made for one or more of the measured variables including contact pressure, contact force and impression setting to be detected both in the transfer unit and in the at least one third unit. Furthermore, the values detected are to be used to determine whether one or more of these measured variables is higher in the third unit than the corresponding value in the transfer unit. Should this be the case, then, in order to avoid increased pressing on the adhesive in the third unit and therefore the adhesive being squeezed out, the invention provides for the impression setting and/or the contact force as a controlled variable to then be reduced in the third unit.

In the controlled case, provision can be made for the controlled variable, which is to be changed, to also correspond to the measured variable but provision can also be made for the controlled variable to differ from the measured variable. This is the case, in particular, when the measured variable is the contact pressure and, for example, the impression setting functions as a controlled variable.

In an alternative embodiment, provision is made, given the same case, for the impression setting or the contact force in the transfer unit to be increased.

In particular, provision can be made in each case for the impression setting or, directly, the contact force in the third unit, to be reduced to such an extent that it is lower than or equal to the corresponding value in the transfer unit or for the impression setting or the contact force in the transfer unit in this case to be increased such that it is always equal to or higher than in a subsequent third unit.

Equally well, it is also possible for the impression setting or the contact force in the third unit to be reduced at the same time, while the impression setting or the contact force in the transfer unit is increased, and for these to be coordinated with each other in such a way that, in terms of effect, the contact force or impression setting in the transfer unit is no lower than that in the subsequent third unit.

In order to ensure the most accurate possible regulation of one of the controlled variables including contact force or impression setting, provision is further made for the contact pressure between the surfaces in the nip to be detected by a sensor in one of the surfaces. In this way, the regulation of the contact forces or the impression setting in the transfer and/or the subsequent third unit can be carried out in such a way that the difference of the contact pressures in the transfer unit and in the nip of the third unit is varied to the benefit of the contact pressure in the transfer unit or vice versa.

According to the invention, for this purpose the film transfer apparatus is to be configured in such a way that at least one pressure sensor is to be integrated in a surface forming a nip. With the aid of this sensor, an appropriate analysis of the contact pressures actually prevailing can then be carried out and an evaluation can be performed by the evaluation device, which is connected to a registration device for registering the measured variable. Additionally, through the use of the setting apparatus including the evaluation device, the appropriate impression settings and/or contact forces in the units can be regulated in such a way that the pressure actually acting between the surfaces of the nip in the transfer unit is never lower than the corresponding pressure in the following third unit.

In a development according to the invention of the film transfer apparatus, provision is made for the surface including the sensor to be formed by a replaceable cover for the purpose of simpler maintenance of the pressure sensor and in order to ensure its function. The surface can preferably be a printing blanket of the transfer cylinder or a blanket of a following printing unit.

In order to simplify the evaluation device, provision is made for the contact pressure detected by the sensor to be transferred through the use of a wireless transfer method to a receiver provided outside the nip, for the purpose of passing it on to an evaluation device. In this way, it is advantageously possible to dispense with wiping contacts or an evaluation device provided in the region of the nip.

Alternatively, it is also possible for the contact force of the surfaces on each other to be determined by a force measurement in the region of one or more layers of at least one of the surfaces set against each other. This applies both to the surfaces of the transfer nip and to the surfaces of the nip in the subsequent third unit. In this way the contact force actually measured in the transfer unit and in the subsequent third unit can be used for the purpose of regulation. The setting can then be made in such a way that the differences in the contact forces in the units is reduced or canceled. In addition, the detected values of the contact force can be used as a measured variable and, by regulating the controlled variable including contact force and/or impression setting, the difference of the contact forces can be optimized, so that the contact force in the transfer unit is no lower than in a following unit.

In terms of apparatus, provision is made as described for the pressure sensor to include a transmitting element which, without contact, transmits the variables determined by the pressure sensor to a receiving unit and which is connected at least to the evaluation device.

According to the invention, particularly great flexibility of the film transfer apparatus is achieved by both the application unit, the transfer unit and also the subsequent third unit or further subsequent third units in each case being printing units of a conventional offset printing press.

With the objects of the invention in view, there is furthermore provided a covering surface to be drawn onto a cylinder or a plane. The covering surface comprises a pressure sensor integrated in the covering surface for detecting pressure acting on the covering surface.

The cylinder can, for example, be a transfer cylinder of a transfer unit or a corresponding impression cylinder, or it can be a blanket cylinder of a printing unit. It is also intended to include covering surfaces which are applied to flat surfaces.

In addition to the integrated pressure sensor, the invention also provides for the covering surface to have a transmitter integrated in it for the non-contact transmission of the pressure detected by the pressure sensor to a receiving device.

In particular, the intention is to include method steps in which differences in the measured variables are predefined as limiting values which are not to be exceeded or to which the controlled variables are to be controlled. It is also possible for a value for the difference of the measured variables to be predefined, which is intended always to be maintained. The controlled variables must then be regulated in accordance with this predefinition.

Other features which are considered as characteristic for the invention are set forth in the appended claims.

Although the invention is illustrated and described herein as embodied in a method for transferring a transfer layer from a carrier film, a film transfer apparatus and a covering surface for a film transfer apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
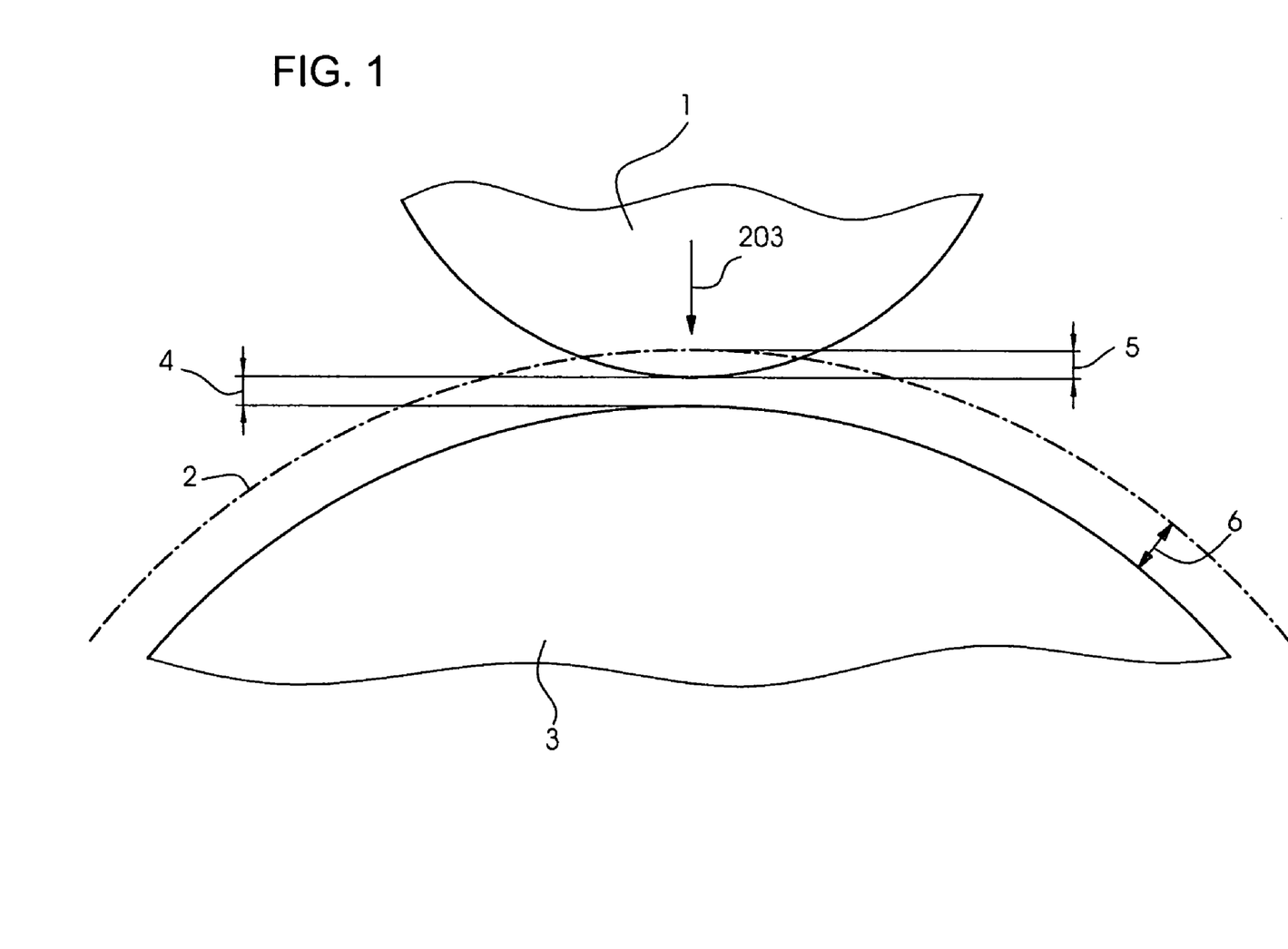
FIG. 1 is a fragmentary, diagrammatic, cross-sectional view of a blanket cylinder and an impression cylinder illustrating an impression setting.

Referring now to the figures of the drawings in detail and first, particularly, to FIG. 1 thereof, there is seen a diagram illustrating an impression setting 5 in a press nip 4.

Figure 2:
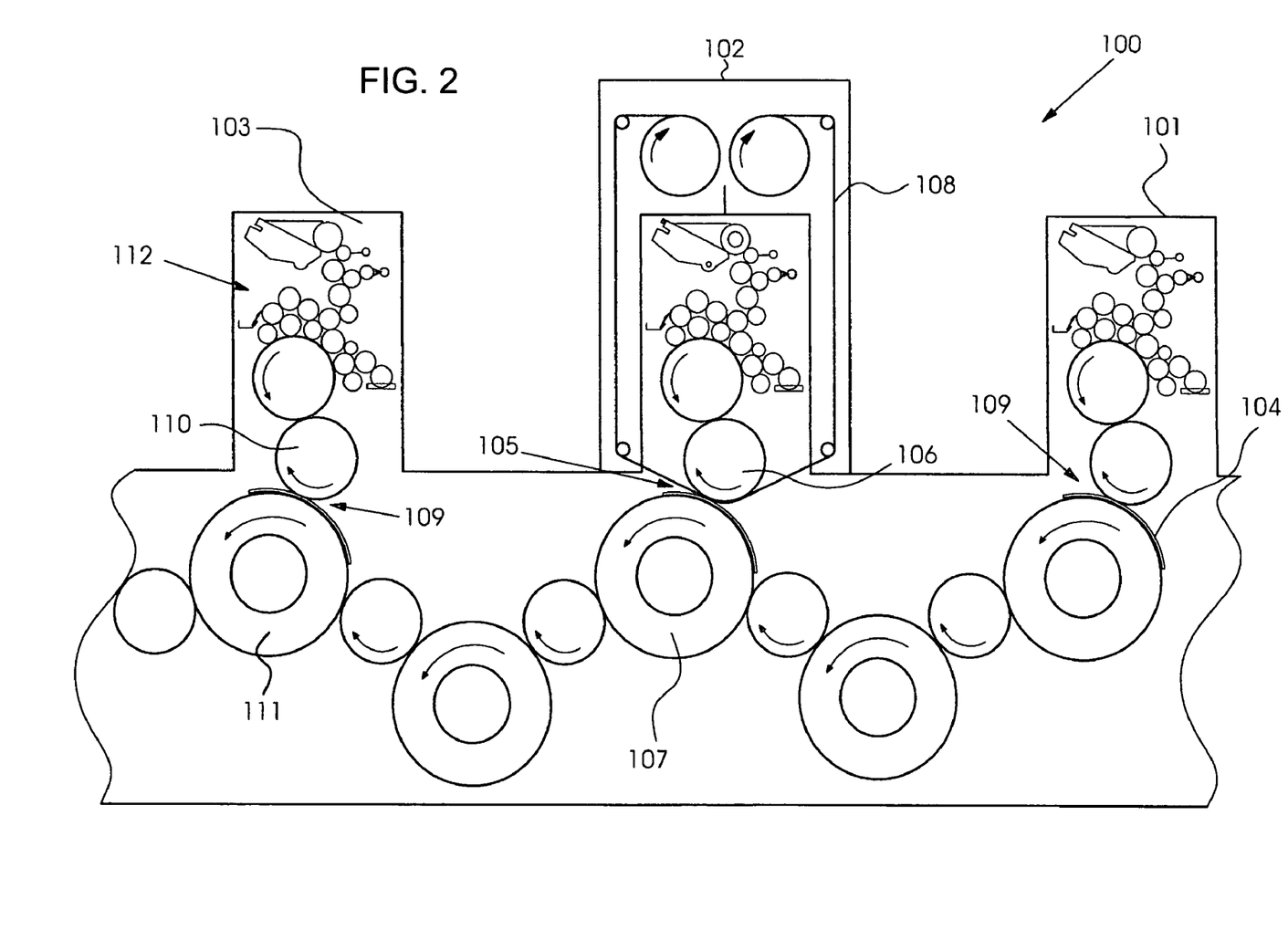
FIG. 2 is a fragmentary, longitudinal-sectional view of part of a film transfer apparatus.

The press nip 4 of a printing unit 103 or a transfer unit 102 or an application unit 101. seen in FIG. 2. is formed by a blanket cylinder 1 and an impression cylinder 3. The impression cylinder 3 in this case carries a sheet 2 through the corresponding unit and therefore also through the press nip 4. In the press nip 4, a contact pressure 203 is exerted on the sheet 2. This contact pressure 203 on the sheet 2 results from the surface of the blanket cylinder 1 overlapping the surface of the sheet 2.

In the case illustrated herein, the sheet 2 has a sheet thickness 6 which is greater than the press nip 4. As a result, as illustrated, an overlap occurs between the printing material 2 and the blanket cylinder 1. The magnitude of this overlap is characterized and registered by the impression setting 5. If the sheet thickness 6 is larger than the press nip 4, then one speaks of a negative impression setting 5. However, the sign is usually left out and one speaks only of the magnitude of the impression setting 5. The impression setting 5 is generally an adjustable controlled variable and, at the same time, also constitutes a measured variable which can be detected.

Possible impression settings can be set in terms of magnitude in a range between 0.1 mm and 0.3 mm. Values between 0.1 mm and 0.15 mm are usual.

FIG. 2 shows a portion of a film transfer apparatus 100, in a sectional view from the side. In this case, the film transfer apparatus 100 illustrated herein is a conversion of a conventional printing press. For the purpose of better illustration, only three units 101, 102 and 103 of the film transfer apparatus 100 are illustrated herein. The film transfer apparatus 100 in this case can have still further units, such as printing units, numbering units, pressing units and so on. In particular, a feeder and a delivery of the film transfer apparatus 100 are not illustrated herein.

A sheet 104 is led through the film transfer apparatus 100 from right to left by a non-illustrated feeder. Firstly, the sheet 104 has adhesive applied to it in the application unit 101. The sheet 104 with adhesive applied is then led further through the film transfer apparatus, in order to be led through a transfer nip 105 of the transfer unit 102 together with a transfer film 108.

The transfer nip 105 of the transfer unit 102 in this case is formed by a transfer cylinder 106 and an impression cylinder 107. The transfer cylinder 106 is frequently also a blanket cylinder of a conventional printing unit.

Figure 3A:
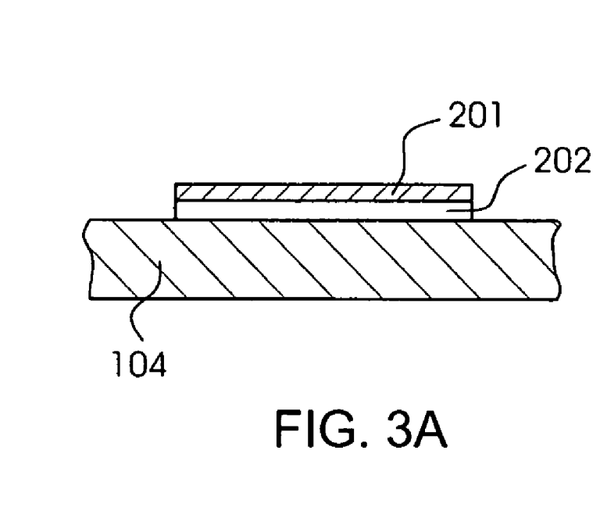
FIG. 3A is a fragmentary, cross-sectional view of a sheet with a transferred transfer layer.
Figure 3B:
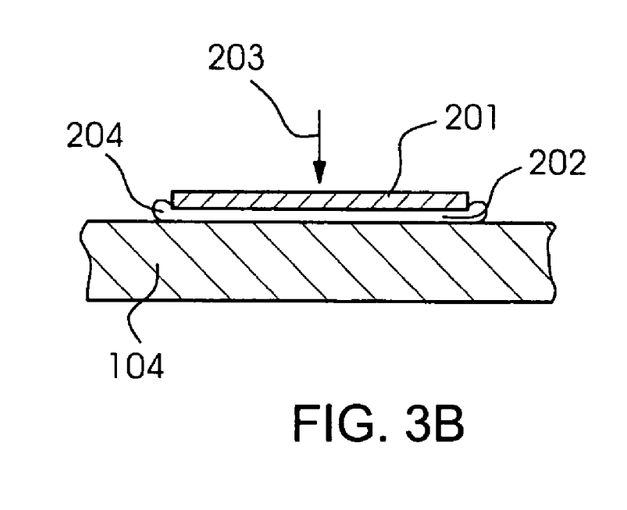
FIG. 3B is a fragmentary, cross-sectional view of the sheet with the transfer layer under increased contact pressure.

In a manner similar to that illustrated in FIG. 1, the transfer cylinder 106 and the impression cylinder 107 are set against each other in such a way that, while taking the sheet 104 into account, there is a negative impression setting 5. In this way, in the transfer nip 105 a transfer layer 201, shown in FIGS. 3A and 3B, is transferred from the transfer film 108 under the action of pressure onto the printing material 104 to which adhesive has been applied.

In this case, the transfer of the transfer layer 201 is carried out with sharp edges only to the region of the sheet 104 to which an adhesive layer 202 has been applied. This is illustrated in FIG. 3A, for example.

The sheet 104 with the adhesive layer 202 and the transfer layer 201 applied in this way is led further through the film transfer apparatus 100 and fed to a first third unit 103. In the case illustrated herein, the third unit is a printing unit 103. The sheet 104 is led through a press nip 109 and has ink applied. In this case, the ink in the printing unit 103 can be transferred both to regions which have a transfer layer 201 or to regions which do not. The printing unit 103 includes an inking unit 112 for the application of ink.

The press nip 109 is formed by a blanket cylinder 110 and an impression cylinder 111. In this case, too, a negative impression setting 5 is set between the impression cylinder 111 and the blanket cylinder 110 in order to transfer a non-illustrated printing ink.

The sheet 104 is led further through the film transfer apparatus 100 and further third units, which are disposed downstream of the printing unit 103. Alternatively, it is also possible that the sheet 104 is not fed to any further third units but, possibly after passing through a dryer section, is subsequently fed straight to a non-illustrated delivery. The further non-illustrated third units can also be printing units, varnishing units, embossing units, pressing units, numbering units, punching or perforating units or the like.

FIG. 3A is a diagrammatic, cross-sectional view from the side, showing a sheet 104 after it has passed through an application unit 101 and a transfer unit 102. In the application unit 101, the adhesive layer 202 has been transferred to some regions of the sheet 104 and the transfer layer 201 has subsequently been applied from the transfer film 108 to the adhesive layer 202 in the transfer unit 102. As a result of the negative impression setting 5 in the transfer unit 102, the contact pressure 203 has also been exerted on the sheet 104 having the adhesive layer 202 in the transfer nip 105. As a result, the adhesive layer has been pressed out, so that it assumes a larger area. This applies at least until a lower contact pressure prevails in the application unit 101 than in the transfer nip 105.

Irrespective of the different relationships with respect to the pressure in the press nip 109 of the application unit 101 and in the transfer nip 105 of the transfer unit 102, the adhesive layer 202 in the transfer nip 105 is offered a transfer layer 201 from the transfer film 108 over its entire area and is taken from the latter substantially with accurate edges. A relatively sharp-edged transfer layer 201 is thus formed which has a two-dimensional extent substantially identical to the adhesive layer 202 on the sheet 104.

If the sheet 104 with the adhesive layer 202 and the transfer layer 201 is led through a subsequent unit 103 and if a higher contact pressure 203 is exerted in this case on the transfer layer 201, the sheet 104 and the adhesive layer 202, then the adhesive layer 202 under the transfer layer 201 will be pressed out, since it is substantially incompressible, and squeezed-out edges 204 of the adhesive layer 202 will be formed beside the edges of the transfer layer 201. These squeezed-out edges 204 of the adhesive layer 202 can then transfer to the blanket cylinder 110 and therefore into the inking unit 112 in the printing unit 103. As a result of the transfer of an adhesive compound into the inking unit 112, the ink of the printing unit 103 can be contaminated. In addition, adhesive on the blanket cylinder 110 can ensure that the transfer layer 201 can be pulled back from a following sheet 104 onto the blanket cylinder 110. In that way, firstly contamination of the printed image produced on the printing material 104 by the printing unit 103 can occur and, additionally, destruction of the transfer layer 201 can occur.

The formation of such squeezed-out edges 204, brought about by an increased contact pressure 203, is illustrated in FIG. 3B.

Figure 4:
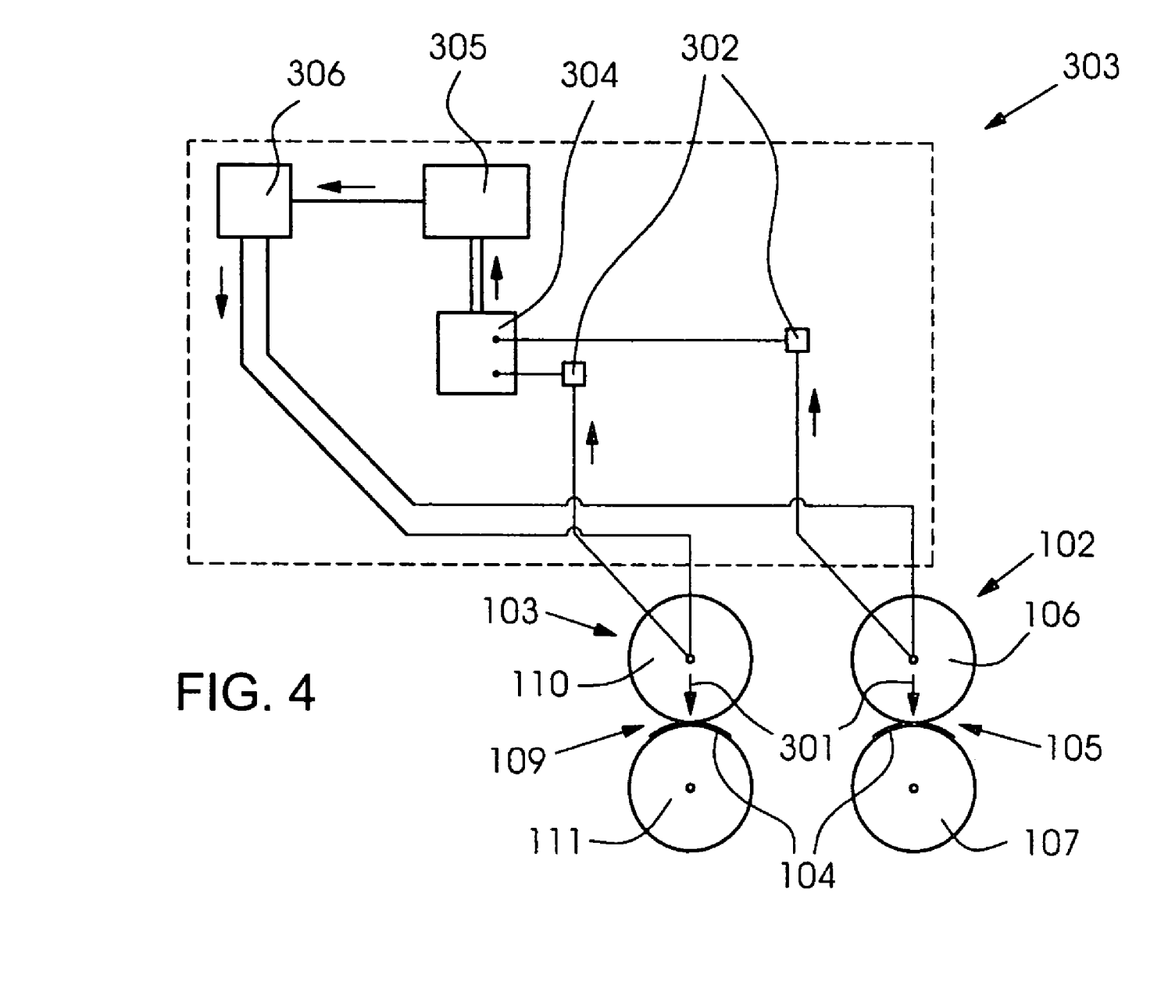
FIG. 4 is a schematic and block diagram illustrating a setting apparatus of a film transfer apparatus.

FIG. 4 schematically illustrates a setting apparatus of a film transfer unit, which sets the impression settings in the transfer unit 102 and in a following third unit, which is to say in the printing unit 103.

In this case, identical designations describe the same elements as in the preceding drawings. For the purpose of clarification, the illustration of elements not involved in a setting operation has been omitted in this case.

In the transfer unit 102 and in the printing unit 103, an impression setting 301 and a corresponding contact pressure is exerted on a sheet 104. In this case, the impression setting 301 is a measured variable and can be detected by the registration device 302 and is passed on by the latter to an evaluation device 304. At the latest, the evaluation device 304 allocates comparative variables to the detected measured variables. These are fed to a difference forming element 305, which passes on the result of a difference formation to a regulating device 306. Depending on the magnitude and sign of the difference formed in the difference forming element 305, the regulating device 306 regulates the transfer cylinder 106 or blanket cylinder 110 in such a way that the impression setting 301, which now functions as a controlled variable, in each case changes in such a way that an impression setting 301 which would be lower than in the printing unit 103 is avoided in the film transfer unit 102. An impression setting 301 which is lower than in the following printing unit 103 is then never set in the film transfer unit 102.

In a first alternative:
the impression setting 301 in the film transfer unit 102 is increased to such an extent that the difference in the difference forming element 305 at least results in zero again or else the impression setting in the film transfer unit 102 is greater than the impression setting 301 in the printing unit 103;

in a second alternative:
the impression setting 301 in the printing unit 103 is reduced until the difference forming element 305 detects that the impression setting 301 in the film transfer unit 102 is once more equal to or greater than the impression setting 301 in the printing unit 103; or in a third alternative:
the impression setting 301 in the printing unit 103 is reduced and at the same time the impression setting 301 in the film transfer unit 102 is increased so that, as a result, the difference in the difference forming element 305 can be formed in such a way that in this case in the film transfer unit 102 there is at least an equally high impression setting 301 or a higher impression setting 301 than in the following printing unit 103.

Figure 5:
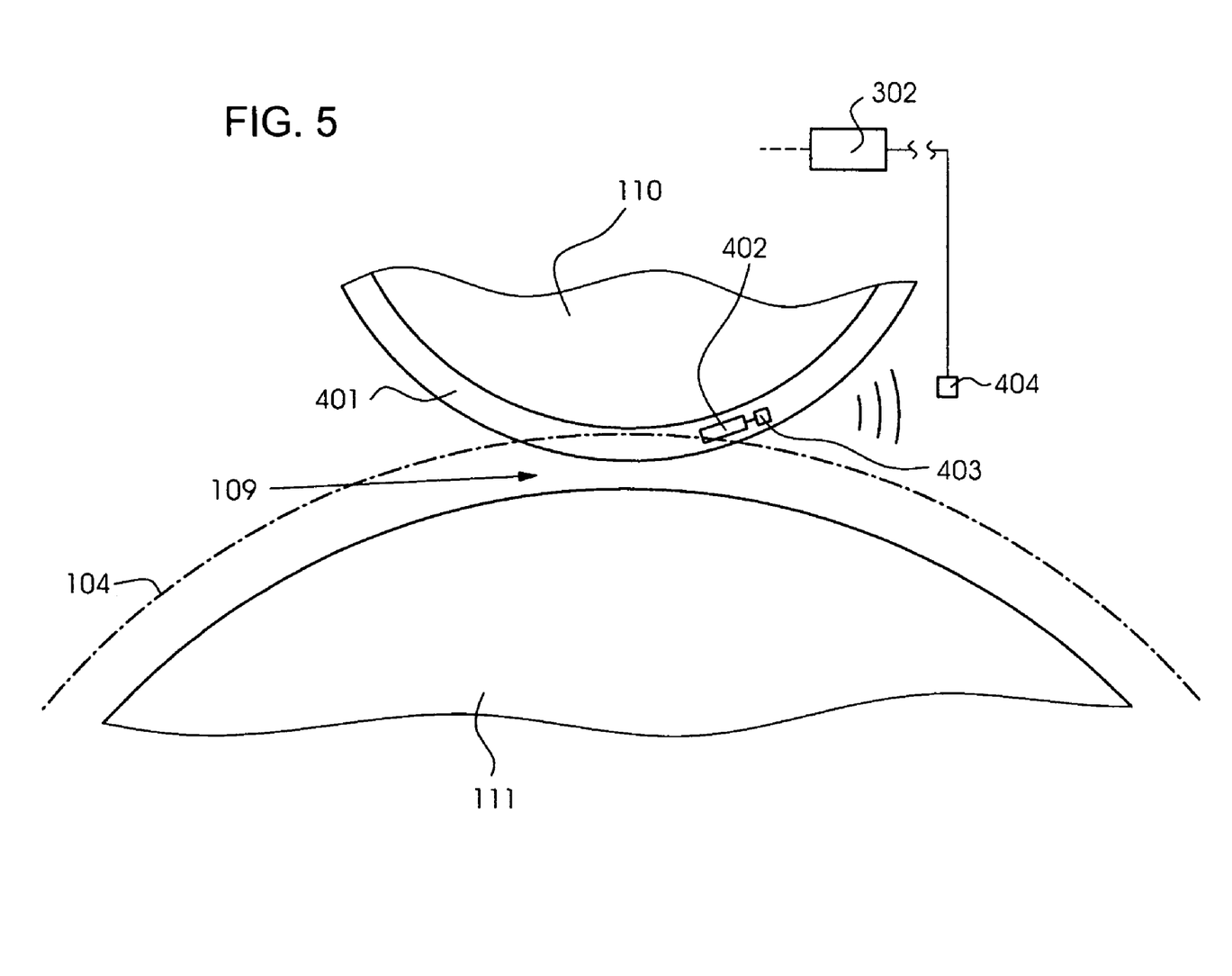
FIG. 5 is a fragmentary, cross-sectional view of a blanket cylinder and an impression cylinder illustrating a blanket with a pressure sensor.

FIG. 5 shows a press nip 109 as illustrated in FIG. 2 for a printing unit 103.

The press nip is also formed in this case by the impression cylinder 111 and the blanket cylinder 110. As opposed to the simplified illustration in FIG. 2, a cover, which is to say a blanket 401 of the blanket cylinder 110, is also illustrated herein.

As is illustrated in FIG. 4, the setting device 303 is able to regulate the impression setting 301 in the transfer unit 102 and in a subsequent third unit such as a printing unit 103, as a function of the detected impression setting 301 in the respective units. Alternatively, such regulation of the impression setting 301 in the aforementioned units can also be carried out directly as a function of the measured pressure in the press nip 109 of a printing unit 103 or in the transfer nip 105 of the transfer unit 102.

In order to then regulate to the pressure actually prevailing in the transfer or printing unit 102 or 103 as a measured variable instead of to the existing impression setting 301, provision is made in the alternative presented in this case for a pressure sensor 402, which is connected to a transmitter 403, to be integrated in the blanket 401 which is drawn on. This transmitter transmits the measured pressure in a wireless manner to a receiving device 404, which passes this detected value on to the registration device 302. The further regulation of the impression settings 301 (which continues to function as a controlled variable) in the relevant units is carried out in a manner analogous to that described with reference to FIG. 4, with the apparatuses also provided there. Instead of regulating to the difference between the impression settings 301 in the transfer unit 102 and the printing unit 103, regulation is carried out directly in this case to the difference between the pressures prevailing in the transfer nip 105 and the press nip 109. This is made possible by the pressure sensor 402 provided there.

If the contact pressure 203 or the impression setting 301 in a third unit downstream of the film transfer unit 102, such as in a directly adjacent printing unit 103, exceeds the contact pressure or the impression setting 301 which is exerted on the printing material in the transfer unit 102 itself, then it is possible for the consequence described and shown in FIG. 3B to occur, which is that the adhesive layer 202 under the transfer layer 201 placed on it is squeezed out and squeezed-out edges 204 occur. This has the negative consequences already outlined above. To this extent, through the use of the setting apparatus 303, it is possible to avoid an increased contact pressure 203 occurring at all in a subsequent third unit as compared with the transfer unit 102.

For this purpose, there are firstly 3 alternatives, regarding which measured variables the setting apparatus 303 can regulate. In a first embodiment, this is the impression setting 301, which is detected directly both in the transfer unit 102 and in a following third unit, for example in the subsequent printing unit 103. Alternatively, it is also possible to regulate directly to the measured pressure through the use of a pressure sensor 402 as in FIG. 5 or the contact force of the cylinders in the units can be used as a measured variable.

As already described, a difference is formed (alternatively, the formation of a ratio is also possible), which gives information as to the unit in which, that is to say in the transfer unit 102 or in the printing unit 103, a higher contact pressure 203 or a higher impression setting 301 is present or has been set.

If it is detected in this case that a higher contact pressure 203 prevails in the transfer unit 102, i.e. more accurately in the transfer nip 105 of the transfer unit 102, than in a subsequent printing unit 103, then it is possible to dispense with a regulation of the impression settings 301 or of the contact forces acting on the bearings of the cylinders involved. In this case, pressure relationships prevail which are not suitable or adequate to impair the quality of the transfer layer being transferred or of the subsequent print on the transfer layer or the printing material 104.

The same applies to the case in which regulation to the impression setting 301 or the contact force is carried out instead of to the contact pressure 203. If it is detected that the impression setting 301 in the transfer unit 102 exceeds that in a subsequent printing unit 103, regulation is not necessary in order to ensure the quality.

If it is detected that the contact pressure 203 or the impression setting 301 or the contact force, as measured variables in the transfer unit 102, is lower than the contact pressure 203 or the impression setting 301 or contact force in a subsequent printing unit 103, then regulation through the use of the setting apparatus 303 is carried out, so that a state is reproduced in which in no following third unit does the contact pressure 203 or the impression setting 301 or the contact force, such as in a following printing unit 103, exceed the contact pressure 203 or the impression setting 301 or the contact force in the film transfer unit 102.

This state, which is to be established in order to ensure the quality of the printed product at a high level, can be reached through various alternative methods.

Alternative 1a:

In the transfer unit 102, the impression setting (as a controlled variable) in the transfer nip 105 is increased until it at least corresponds to the impression setting (as a measured variable) in the subsequent printing unit 103.

Alternative 1b:

If regulation is not carried out to the impression setting but to the measured contact pressures 203 as measured variables, then the impression setting 301 (as a controlled variable) in the film transfer unit 102 is increased until the measured contact pressure 203 in the transfer nip 105 is at least as high as the measured contact pressure 203 in a subsequent press nip 109.

Alternative 1c:

It is alternatively also possible not to detect the contact pressures 203 or the impression setting 301 and to regulate to these but to regulate directly to the setting forces, as a measured variable, with which for example the blanket cylinder 110 or the transfer cylinder 106 is pressed against the impression cylinder 111 or 107 through its axle bearings. Then, if the contact pressure in a following printing unit 103 exceeds that in the film transfer unit 102, the contact force (now as a controlled variable) in the transfer unit 102 can be increased until it corresponds at least to the setting force in a following printing unit 103.

Alternative 1d:

If regulation to the measured contact pressure 203 is carried out and the contact forces of the blanket cylinder 110 and transfer cylinder 106 can be adjusted and evaluated by measurement, then it is also possible to regulate the corresponding contact force to the transfer cylinder 106 in the transfer unit 102 directly until the measured contact pressure 203 in the transfer unit 102 is at least as high as the contact pressure 203 in a subsequent printing unit 103.

Alternative 2:

The same method steps as in alternatives 1a to 1d are also conceivable inasmuch as the impression setting 301, the contact pressure 203 and the contact force in the transfer nip 105 of the transfer unit 102 are in each case kept constant and the impression setting 301 or the setting force of the blanket cylinder 110 are in each case reduced as controlled variables in a following printing unit 103 until the result once more is a setting in which the impression setting 301, the contact force or the contact pressure 203, as measured variables in the film transfer unit 102, are at least exactly as large as the impression setting 301, the contact force or the contact pressure 203 in a following printing unit 103.

Alternative 3:

In order to achieve an at least equally high impression setting 301, contact force or an at least equally high contact pressure 203 in the film transfer unit 102 as compared with a corresponding impression setting 301, contact force or contact pressure 203 in a following printing unit 103, combinations of the alternatives 1 and 2 are also conceivable inasmuch as in each case both the impression settings 301 in the transfer unit 102 and in the printing unit 103 are varied simultaneously or the contact forces on the transfer cylinder 106 and the blanket cylinder 110 are varied simultaneously or the impression setting 301 in one of the two units is varied while the contact force is varied in the other unit until either equal impression settings 301, equal contact forces or equal contact pressures 203 build up in the transfer unit 102 and in a subsequent printing unit 103 or the impression setting 301, the contact force or the contact pressure 203 in the transfer unit 102 even exceeds the corresponding value in a following printing unit 103.

The common factor in all these possible methods is that, as a result of this regulation through the use of the setting apparatus 303, squeezing out of the adhesive layer 202 in a third unit following the transfer unit 102, such as a following printing unit 103, is avoided and the quality of the resulting printed product is beneficially no longer reduced by the squeezed-out edges 204 of the adhesive layer 202, or at least the reduction in quality can be made smaller.

The invention claimed is:

1. A film transfer apparatus, comprising:
    an application unit for applying an adhesive at least to regions of a printing material guided through said application unit;
    a transfer unit disposed downstream of said application unit and having a transfer nip for transferring a transfer layer at least to regions of the printing material, said transfer layer and a carrier film together forming a transfer film;
    at least one third unit having a nip formed by two surfaces for further processing of the printing material with said transfer layer applied; and
    at least one setting apparatus for setting at least one controlled variable selected from the group consisting of contact force and impression setting in at least one of said transfer nip of said transfer unit or said nip of said at least one third unit as a function of at least one detected measured variable selected from the group consisting of contact pressure, contact force and impression setting in both of said nips.

2. The film transfer apparatus according to claim 1, wherein said setting apparatus includes at least one registration device for detecting at least one of said measured variables selected from the group consisting of contact pressure, contact force and impression setting in said transfer nip of said transfer unit and in said nip of said at least one third unit.

3. The film transfer apparatus according to claim 2, wherein said setting apparatus includes an evaluation device for evaluating said detected measured variables and a control device for regulating at least one of said controlled variables selected from the group consisting of contact force and impression setting in at least one of said transfer nip of said transfer unit or said nip of said third unit as a function of at least one of said detected measured variables.

4. The film transfer apparatus according to claim 3, wherein said evaluation device has at least one of a ratio forming element or a difference forming element to determine a ratio or a difference between said measured variables detected in said nip of said third unit and in said transfer nip.

5. The film transfer apparatus according to claim 3, wherein at least one of said transfer nip or said nip in said third unit has a surface with an integrated pressure sensor connected to a registration device for data transfer.

6. The film transfer apparatus according to claim 5, wherein at least one of a transfer surface or a top surface of said surface of said nip of said third unit is formed by a replaceable cover.

7. The film transfer apparatus according to claim 5, wherein said pressure sensor includes a transmitting element contactlessly transmitting said manipulated variables determined by said pressure sensor to a receiving unit connected at least to said evaluation device.

* * * * *